May 6, 1941.   G. A. WAHLMARK   2,241,046

FLUID MOTOR

Filed Feb. 7, 1938     5 Sheets-Sheet 1

Inventor:-
Gunnar A. Wahlmark,
By [signature] his Atty.

May 6, 1941.  G. A. WAHLMARK  2,241,046

FLUID MOTOR

Filed Feb. 7, 1938  5 Sheets-Sheet 2

Inventor:
Gunnar A. Wahlmark.

May 6, 1941.  G. A. WAHLMARK  2,241,046
FLUID MOTOR
Filed Feb. 7, 1938  5 Sheets-Sheet 4

Inventor:
Gunnar A. Wahlmark
By his Atty.

May 6, 1941.　　　G. A. WAHLMARK　　　2,241,046
FLUID MOTOR
Filed Feb. 7, 1938　　　5 Sheets-Sheet 5

Fig. 10.

Inventor:
Gunnar A. Wahlmark

Patented May 6, 1941

2,241,046

UNITED STATES PATENT OFFICE 2,241,046

FLUID MOTOR

Gunnar A. Wahlmark, Rockford, Ill.

Application February 7, 1938, Serial No. 189,049

17 Claims. (Cl. 121—119)

The invention relates to a fluid motor; more particularly, to one operable at a plurality of speeds, it being the general object of the invention to provide a new and improved multi-speed motor.

Another object is to provide a two-speed fluid motor of new and simplified construction and particularly adapted for use with a feed and rapid traverse drive for machine tools.

Other objects include the provision of a two-speed fluid motor of improved construction capable of producing a high torque at a slow speed for feed purposes and a high speed for rapid traverse; enabling the use of a constant displacement wobbler for driving the motor shaft; and having low speed and high speed piston devices grouped annularly about the drive shaft with a speed control valve positioned intermediate the shaft and piston devices so as to provide a compact small sized unit.

A further object is to provide in such a motor a new and improved wobble plate construction for connecting the pistons to drive the motor shaft.

A further object is to provide such a motor having an adjustable wobble plate construction to permit of further adjustment of the speeds imparted to the motor shaft by the different sets of pistons.

Other objects will become readily apparent from the following detailed description taken in connection with the accompanying drawings, in which.

Although the invention is susceptible of embodiment in many different forms, there is shown in the drawings and herein described in detail three forms selected for the purpose of disclosing the principles of the invention. It is contemplated that various modifications and alternative constructions may be made by those skilled in the art without departing from the spirit and scope of the appended claims.

In the form illustrated in Figs. 1 to 5 of the drawings, the invention is embodied in a two-speed fluid motor which comprises generally a casing 10 within which is housed fluid handling mechanism 11 of the reciprocatory piston type, a rotatably mounted shaft 12 and conversion means 13 for converting the reciprocatory motion of the fluid handling pistons into rotary motion of the shaft. An inlet passage 14 and an outlet passage 15 are formed in one end of the casing 10 and cooperate with suitable ports and a valve 16 to supply fluid under pressure to the fluid handling mechanism and for discharging the fluid after it has functioned to impart reciprocatory movement to the pistons.

Figure 5:
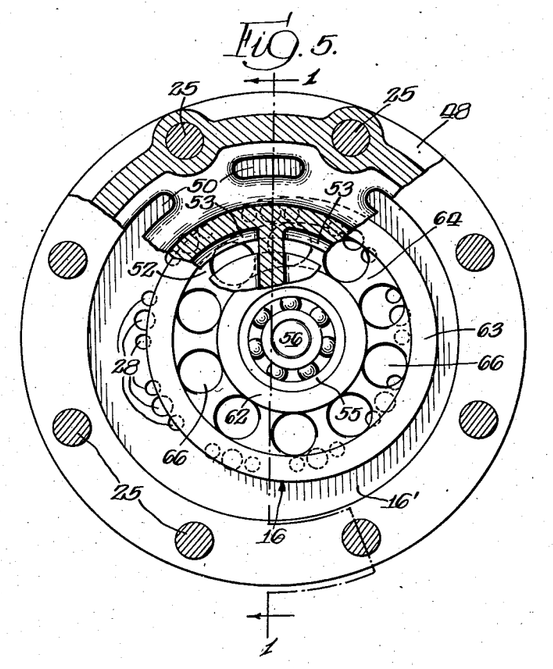
Fig. 5 is a view partly in section generally along the line 5—5 of Fig. 1.
Figures 6, 7:
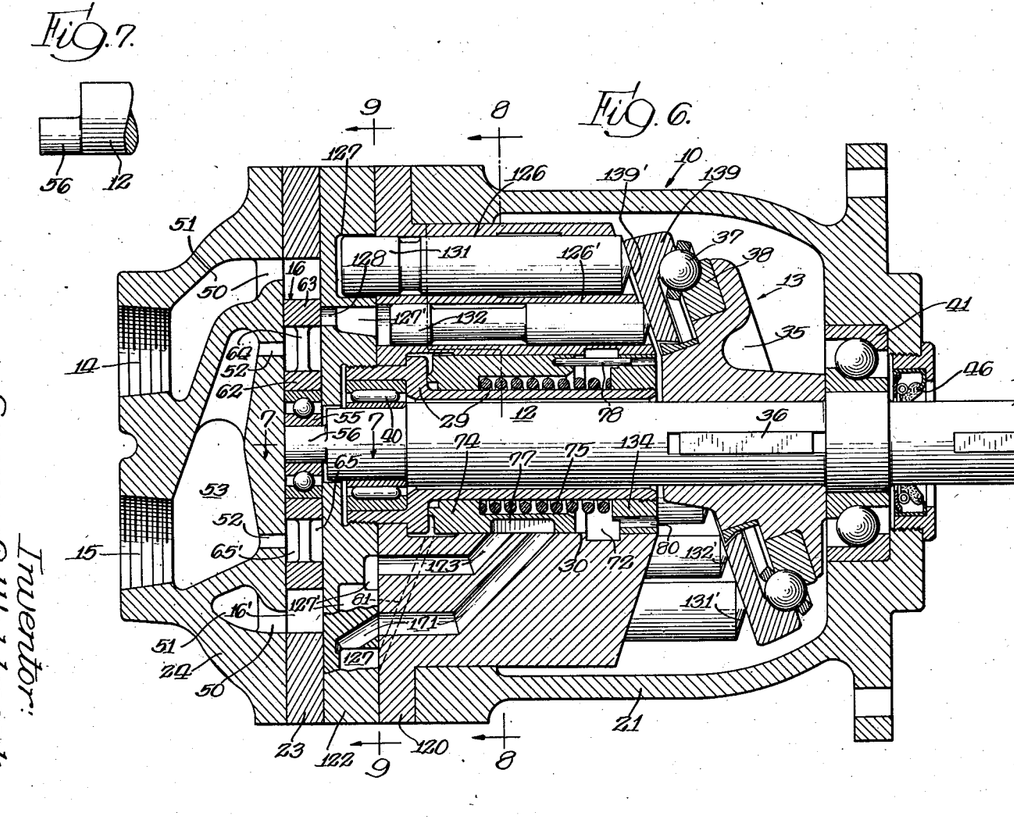
Fig. 6 is a longitudinal section through a modified form of the invention, portions thereof being somewhat diagrammatic and in different planes to make the fluid connections clearer.
Fig. 7 is a fragmentary plan view of the left end of the motor shaft looking in the direction of the arrows 7—7 of Fig. 6.
Figure 8:
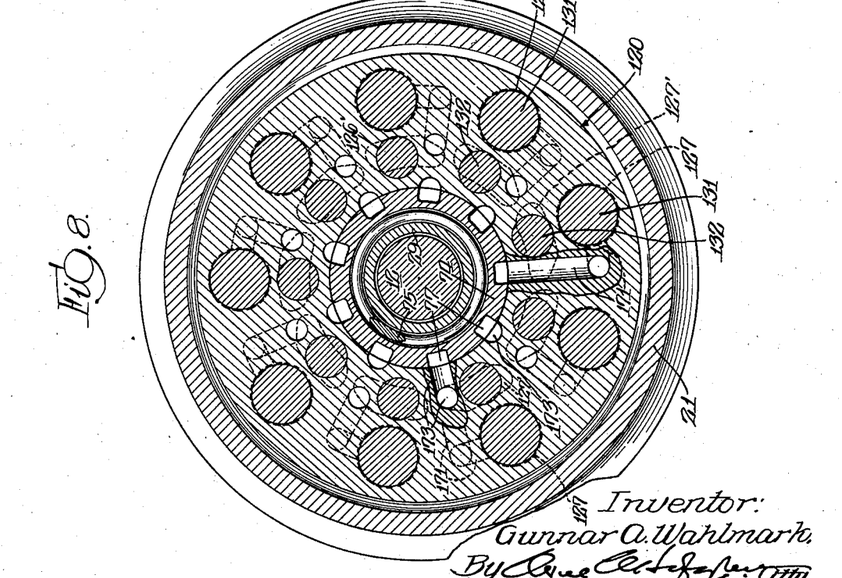
Fig. 8 is a transverse section approximately along the line 8—8 of Fig. 6 with portions broken away to illustrate certain ports more clearly.
Figure 9:
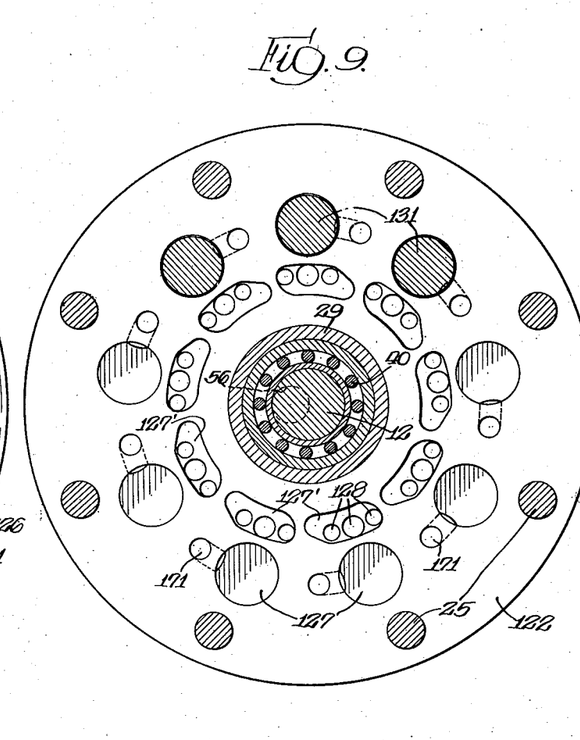
Fig. 9 is a transverse section approximately along the line 9—9 of Fig. 6.

The casing 10 as illustrated herein comprises a plurality of sections 20, 21, 22, 23, and 24 which are secured together to form a unit by means of a plurality of bolts 25 extending through the sections 24, 23, 22, and 20 and into threaded engagement with the section 21. Section 20 constitutes a cylinder block and has a thicker portion 20' formed with a plurality of bores 26, herein nine in number (see Fig. 4), disposed longitudinally of the casing and arranged annularly about the shaft 12. Casing section 22 is in the form of a port plate and abuts against the head or left hand end (Fig. 1) of the cylinder block and cooperates therewith to complete the motor block. The port plate 22 is formed with a plurality of recesses 27 larger in diameter than the bores 26 and registering therewith to complete the head ends of the cylinders. Opening to each of the recesses 27 is a cylinder port 28 which, as best seen in Fig. 5, is somewhat elliptical in shape, being formed by three apertures approximating the shape of an ellipse. The cylinder block 20 and the port plate 22 are secured together by means of a shouldered sleeve 29 inserted through a central aperture formed in the block 20 (by a stepped bore 30) and threaded into the port plate 22.

Figure 1:
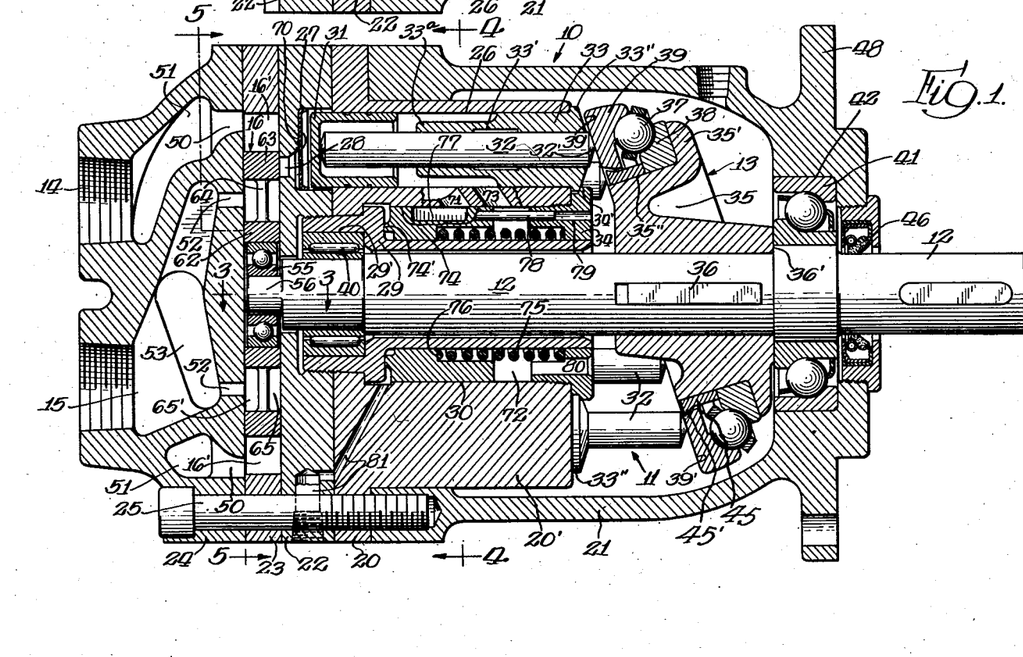
Fig. 1 is a longitudinal central section through a preferred form of the invention along the line 1—1 of Fig. 5.

In the preferred form of the invention illustrated, the fluid handling mechanism 11 comprises a first series of hollow or cup-shaped pistons 31 reciprocably mounted in the cylinder bores 26 and a second series of cylindrical pistons 32 of substantially smaller diameter reciprocably mounted in bushings 33 secured in the rod ends of the cylinder bores 26. The bushings 33 are preferably long to provide ample support for the pistons 32 and have inner ends 33a of reduced diameter so that the cup-shaped pistons 31 overlap the bushings when operating. Annular relief grooves 33' are provided in the bushings intermediate their ends. The bushings 33 are secured in the bores 26 by means of a collar 34 which is screw threaded in the adjacent end of the portion 20' of the casing section 20 and has a flange 34" engaging flanges 33" on the bushings to clamp them against the adjacent end of the section 20. The two series or sets of pistons are selectively operable to drive the shaft 12 at different speeds through the agency of the conversion means 13 in a manner hereinafter more fully described.

The conversion means 13 is herein illustrated in the form of a wobble plate 35 secured to the shaft 12 by means of a key 36 and against a shoulder 36' and provided with an annular flange 35' and a cylindrical surface 35", against which one race 38 of a ball bearing of improved construction is mounted. This ball bearing has a series of balls 37 positioned intermediate races 38 and 39, which carry a combination thrust and radial load in converting reciprocatory movement of the pistons into rotary movement of the shaft 12. The race 39 has a flat surface 39' which engages the adjacent ends of the pistons 32. The piston ends 32' are conical in shape so as to provide a line contact with the race surface 39'. A collar 45 is pressed onto the surface 35" and has a projecting flange 45' which serves to hold the race 39 in assembled relation. The shaft 12 is supported at one end in a needle bearing 40 positioned in a recess 29' in the sleeve 29, and is supported at its other end by a ball bearing 41 positioned in a recess 42 in the casing section 21. A sealing device 46 serves to prevent leakage along the shaft.

The pistons 31 (which may be referred to as low speed pistons) are effective to drive the shaft 12 at a low speed when the fluid motor is supplied with a predetermined volume of fluid under pressure. Pistons 32, of substantially smaller cross section area, may be referred to as high speed pistons, and when operated by an equal volume of fluid under pressure are effective to rotate the shaft 12 at a higher speed. The means for supplying fluid to actuate the low speed and high speed pistons to attain these results will now be described.

The passage 14, passage 15, and valve 16, together with the ports for conducting fluid to and from the cylinder ports 28, are similar to those illustrated and described in my prior U. S. Letters Patent No. 2,190,812 dated February 20, 1940. Thus, the left end of the casing 10, as viewed in Fig. 1, is completed by the sections 23 and 24 with the section 24 in the form of a cap or head containing the supply and exhaust passages 14 and 15. The section 23 is in the form of an annular ring spacing the section 24 from the port plate 22 so as to form a valve chamber 16' therebetween. Inlet passage 14 communicates with the outer edge of the valve chamber 16' by means of a plurality of arcuate ports 50 (see Figs. 1 and 5) and an intermediate annular port 51. Exhaust passage 15 communicates with a plurality of arcuate ports 52 through intermediate ports 53, the arcuate ports 52 communicating with the valve chamber 16' at points spaced inwardly from the periphery thereof, as shown most clearly in Fig. 1. The inlet ports 50 and the exhaust ports 52 are formed concentrically with the shaft 12 as are also the cylinder ports 28.

The cylinder ports are herein controlled by means of the valve 16 which is adapted to effect the opening and closing of the ports and their alternate connection to the inner and outer portions of the valve chamber 16' in timed relation with the reciprocation of the pistons in a manner obtaining a maximum period of port opening and rapid opening and closing of the ports. The valve 16 is circular in form and is mounted by means of a ball bearing 55 on a stud 56 formed eccentrically (see Figs. 1 and 3) on the inner end of the shaft 12 and projecting into the space between the port plate 22 and the section 24.

The faces of the valve 16 are ground so as to have a fluid-tight sliding fit with the adjacent faces of the port plate 22 and the section 24. The valve is most readily pictured as a wheel having a hub 62 and a rim 63 secured to the hub by a plurality of spokes 64 of reduced thickness so as to form annular recesses 65 and 65' interconnected by means of circular openings 66 formed between the spokes. The recess 65' is so disposed that it is always in communication with the arcuate exhaust ports 52 and is of such width that in any position of the valve several of the cylinder ports 28 open in whole or in part thereto. The rim 63 has a radial thickness slightly greater than the width of a port 28, so that in any position of the valve 16, a plurality of ports 28 are disposed in whole or in part outwardly of the valve 16 so as to communicate with the peripheral portion of the valve chamber 16' which is supplied by the inlet ports 50. Thus, the rim 63 of the valve, during rotation of the shaft 12 and the simultaneous orbital movement of the valve, connects the cylinder ports 28 with the inlet ports 50 during the intake strokes of the pistons and connects the cylinder ports 28 with the outlet ports 52 during the exhaust strokes of the pistons. Furthermore, when a piston is at one end or the other of its stroke, the rim 63 closes the corresponding cylinder port 28. In the operation of the valve, the movement of the rim 63 with respect to the cylinder ports 28 is such that the ports are opened and closed very rapidly because the eccentric stud 56 is then moving more directly toward or away from the particular cylinder port.

In the form of the invention chosen for purposes of disclosure, it is contemplated that the low speed pistons 31 will normally function to drive the shaft 12, the high speed pistons 32 then serving as piston rods for the pistons 31 and connecting them to the race 39 of the wobble plate bearing. The pistons 31 are then forced through their power strokes by the fluid under pressure admitted through the cylinder ports 28 and are moved through their return strokes by the wobble plate.

Figure 2:
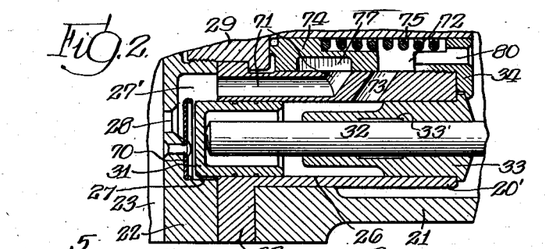
Fig. 2 is a fragmentary section along the line 2—2 of Fig. 4.
Figure 3:
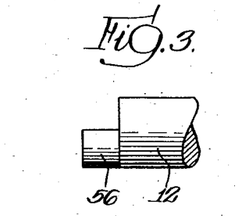
Fig. 3 is a fragmentary plan view of the left end of the motor shaft looking in the direction of the arrows 3—3 of Fig. 1.
Figure 4:
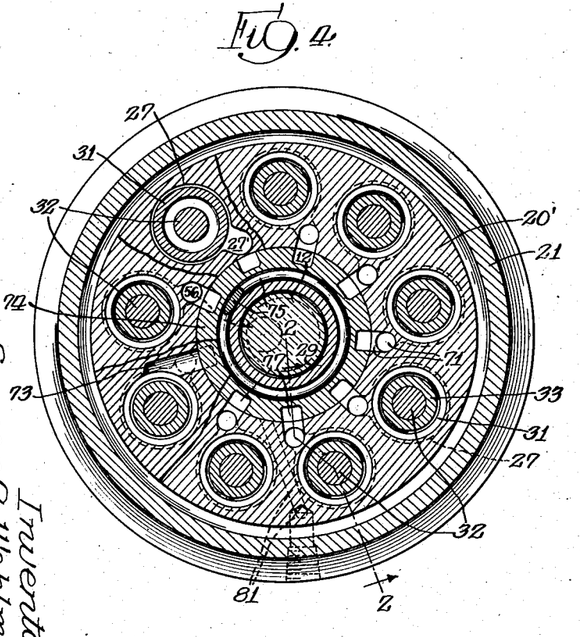
Fig. 4 is a transverse section along the line 4—4 of Fig. 1 with portions broken away for the sake of clearness.

The operation of the shaft 12 at a relatively higher speed by the pistons 32 is effected by establishing communication between the cylinder ports 28 and the cylinder bores 26 at points located to the right (Figs. 1 and 2) of the pistons 31, the pistons 31 then remaining stationary against projections 70 formed on the port plate 22 and functioning as the head ends of the cylinders in which the pistons 32 then reciprocate. As illustrated herein, communication is established intermediate the cylinder ports 28 and the cylinder bores 26 by means of a plurality of ports 71 (Figs. 2 and 4) extending longitudinally adjacent the bores 26 and connecting at one end to extensions 27' of the recesses 27 (Figs. 2 and 4) and at the other end to an annular valve chamber 72 formed intermediate the bore 30 of the casing section 20, the sleeve 29, and the collar 34. Communcation is established between the valve chamber 72 and the bores 26 by means of cross ports 73. The flow of fluid through the ports 71 and 73 is controlled by means of a tubular valve 74 which is slidably mounted in the chamber 72 and is normally held against the left hand end of said chamber (Figs. 1 and 2) by means of a coiled spring 75 positioned intermediate a shoulder 76 on the valve and the collar 34. In this position of the valve 74, fluid cannot flow from the ports 71 through the valve chamber 72 and into the port 73, since the valve then blocks communication between the ports, as illustrated in Fig. 2. To establish communication between the ports 71 and 73, the valve is provided with a plurality of longitudinally extending recesses 77, one for each piston and cylinder device, so located in the valve 74 that when the valve is moved to the right (Figs. 1 and 2) and up against the adjacent collar 34, the recesses 77 connect the ports 71 and 73. In order to permit proper operation of the valve, it is held against rotary movement by means of a pin 78 (Fig. 1) which is carried by the valve and slides in a bore 79 formed in the collar 34. Furthermore, the collar is preferably provided with one or more ports 80 so that pressure will not build up in the valve chamber 72 and prevent operation of the valve. Since the valve 74 (in its low speed position as illustrated in Fig. 2) uncovers the ports 73, the rod ends of the bores 26 are relieved during operation of the low speed pistons through the ports 73, chamber 72 and ports 80.

Means is preferably provided for operating the valve 74 by fluid under pressure, and this is particularly true when the motor is intended for use in connection with the feed traverse mechanism of a machine tool or in a circuit such as that disclosed in my prior U. S. Letters Patent No. 2,214,390 dated September 10, 1940. Thus, the left hand end of the valve 74 has a projecting portion 74' which serves to space the valve away from the end of the valve chamber 72 formed by a flange 29' on the sleeve 29. A fluid port 81 is provided for conducting fluid under pressure to this end of the valve chamber, the adjacent end of the valve then functioning as a piston which is movable by the fluid to shift the valve from its left hand or low speed position to its right hand or high speed position. When the supply of pressure fluid is disconnected, the valve is returned to its low speed position by the spring 75.

In the form of the invention illustrated in Figs. 6, 7, 8, and 9, many of the parts are essentially the same as those illustrated in Figs. 1 to 5 and are similarly numbered. In this second form of the invention, the fluid handling mechanism comprises a first series of large pistons 131 reciprocably mounted in cylinder bores 126 which have enlarged portions 127 at the head ends located in a port plate 122. Conically surfaced ends 131' of the large pistons bear against one race 139 of the wobbler bearing which race is provided with a flat surface 139'. A second series of smaller pistons 132 are reciprocably mounted in bores 126' positioned radially inward from the bores 126. These pistons have conically surfaced ends 132' also bearing against the flat face 139' of the wobbler bearing race 139. The head ends of the cylinders 126' connect with recesses 127' in the port plate 122 which in turn connect with cylinder ports 128.

In this form of the invention, it is contemplated that the pistons 131 and the pistons 132 will be utilized simultaneously to drive the shaft 12 at a low speed and that, alternatively, the pistons 132 alone will be used to drive the shaft 12 at a higher speed. The control means for selecting one set of pistons or the other for driving the shaft 12 is in certain respects quite similar to that illustrated in Figs. 1 to 5. Thus, as illustrated in Figs. 6 to 9, a tubular valve 74 is operable in the left hand posititon shown to connect the head ends 127 of the large cylinders with the head ends 127' of the small cylinders through ports 171 and 173 of the cylinder block 120 by means of the longitudinal recesses 77 of the valve. Since in this form of the invention the cylinder ports 128 connect directly with the small cylinders, the valve 74 is in its left hand position when the large pistons 131 and the small pistons 132 are operative together to drive the shaft 12 at a slow speed. By admitting fluid to the left hand end of the valve 74 from a suitable pressure source by means of a port 81, the valve is moved toward the right so as to close off communication between the ports 171 and 173 and render the pistons 132 alone operable to drive the shaft 12. In this position of the valve 74, the recesses 77 connect the ports 171 to the right hand end of the valve chamber 72 so as to relieve the head ends 127 of the large cylinders through the relief ports 80 in the collar 134.

Figure 10:
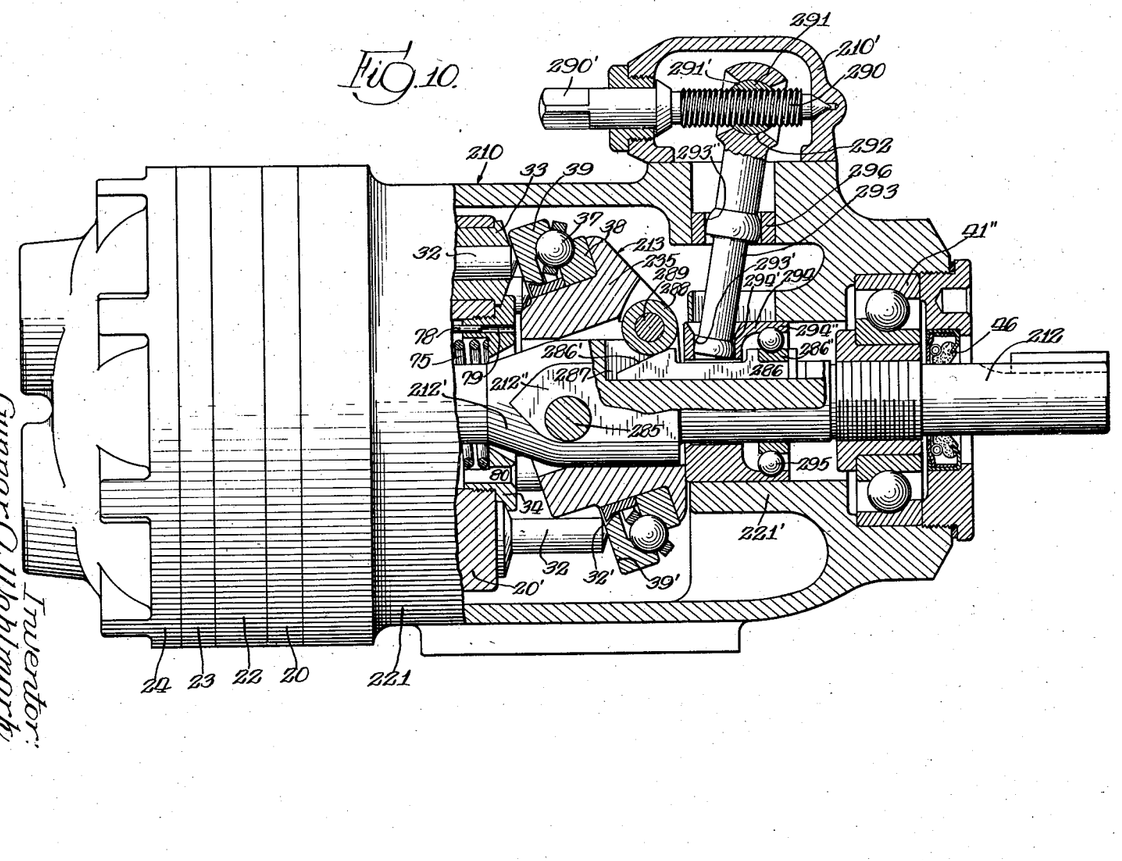
Fig. 10 is a view through another modified form of the invention, partly in longitudinal central section.

In the form of the invention illustrated in Fig. 10, the left hand portion shown in elevation is identical with the similar portion of the form illustrated in Figs. 1 to 5. This form of the invention differs principally in that the conversion means 213 for converting the reciprocatory motion of the fluid handling pistons into rotary motion of the shaft 212 comprises an adjustable wobble plate 235. This plate surrounds an enlarged portion 212' of the shaft (which is provided with oppositely positioned flat portions 212'') and is pivotally secured thereto by means of a pin 285 which extends through the flattened portion of the shaft and the wobble plate.

The position of the wobble plate with respect to the shaft 212 may be adjusted by means of a key 286 which is slidable longitudinally in a suitable keyway 287 in the shaft and has an inclined end or cam surface 286' which engages a roller 288 which is rotatably mounted on a pin 289 secured to the wobble plate 235. Thus, by moving the key 286 toward the left in Fig. 10 longitudinally of the shaft (by means hereinafter more fully described), the wobble plate may be positively tilted around the pivot pin 285. When the key is moved in the opposite direction or toward the right, as shown in Fig. 10, the wobble plate may tip back in a clockwise direction to reduce the stroke of the pistons. Such movement of the wobble plate is insured by placing the pivot pin 285 below the axis of the shaft, thus causing the pistons to exert a greater pressure on the upper or longer arm portion of the wobble plate to maintain the roller 288 against the cam 286'.

As illustrated herein, the means for moving the key 286 longitudinally of the shaft comprises a screw device 290 rotatably mounted in a housing 210' secured to the casing 210. The screw device is preferably squared at 290' to facilitate operation thereof. A nut 291 is screw-threaded onto the screw device 290 and has an outer spherical surface 291' positioned in a corresponding spherical socket 292 formed in one end of a lever 293, the other end of which has a spherical surface 293' engaging in a bore 294' of a sleeve 294 which surrounds the shaft 212 and is slidable longitudinally thereof in a tubular portion 221' of a casing part 221. The sleeve 294 is connected to the key 286 by means of a plurality of balls 295 which cooperate with a portion 294" of the sleeve 294 and an annular ring 286" formed integrally with the key 286 to form a ball bearing, the portions 294" and 286" serving as outer and inner races of the bearing. Intermediate its ends, the lever 293 has a spherical surface 293" which bears against the inner surface of an annular bushing 296 supported in the casing 210 so as to permit the lever 293 to pivot in the bushing 296 and as well to move longitudinally therein.

As mentioned hereinbefore, the remainder of this form of the invention is shown as identical with that shown in Figs. 1 to 5, although the conversion means 213 is equally well adapted for use with other forms of the invention, such, for example, as that illustrated in Figs. 6 to 9. Thus, the casing includes parts 20, 22, 23, and 24, and pistons 32 are slidably mounted in bushings 33 supported in a portion 20' of the casing part 20. Furthermore, the wobble plate is formed in part by a ball bearing consisting of a series of balls 37 positioned intermediate races 38 and 39, the race 39 having a flat surface 39' engaging the adjacent conical ends 32' of the pistons.

It is believed readily apparent that the invention in the forms disclosed herein provides a simple and compact multi-speed motor. When supplied with a constant volume of fluid under pressure, the shaft may be driven at a relatively high speed by using only the smaller pistons, whereas to drive the shaft at a relatively slow speed, the large pistons may be used, or the large pistons together with the small pistons, in the form illustrated in Figs. 6 to 9. By locating the control valve 74 within the cylinder block, a compact and efficient control is obtained. Furthermore, the improved bearing construction for the wobbler and the line contact between the pistons and the adjacent bearing race reduce the wear and provide for a long life of the parts.

If desired, the wobble plate may be made adjustable as illustrated in Fig. 10, in which case the two speeds imparted to the shaft by the pistons may be changed.

I claim as my invention:

1. A two-speed fluid motor comprising, in combination, a casing, a plurality of low speed pistons, a plurality of high speed pistons, a driven shaft, means including an adjustable wobble plate connecting the pistons to drive said shaft, means for conducting fluid to and from said cylinders including a control device operable in one position to effect operation of the low speed pistons and operable in another position to effect operation of said high speed pistons, means for actuating said control device, and means for adjusting the wobble plate.

2. A fluid motor comprising, in combination, a casing, a first series of piston and cylinder devices in said casing, a second series of smaller piston devices positioned in reduced portions of the cylinders of said first series, a driven shaft, means forming an adjustable driving connection between the pistons of said devices and the shaft adjustable to vary the stroke of the pistons, a valve mechanism for controlling the inlet and outlet of fluid to the first series of cylinders, a valve device for selectively directing the fluid into that portion of the cylinders of said first series occupied by the pistons of said second series, and means for adjusting said driving connection means to change the stroke of the pistons.

3. A device of the character described comprising, in combination, a casing, a cylinder therein, a piston slidably mounted in said cylinder, a second piston of smaller size slidably mounted in said cylinder and selectively operable as a piston or as a rod for said first mentioned piston, a driven shaft, means forming a driving connection between said second piston and the driven shaft, means for controlling the inlet and outlet of fluid to the end of said cylinder occupied by said first piston to effect rotation of said shaft at one speed, and means including a valve device for directing fluid to the other end of said cylinder so that the fluid actuates said second piston and drives said shaft at a higher speed.

4. A two-speed fluid motor comprising, in combination, a casing, a cylinder therein, a piston slidably mounted in said cylinder, a second piston of smaller size slidably mounted in said cylinder and selectively operable as a piston or as a rod for said first mentioned piston, a driven shaft, means forming a driving connection between said second piston and the driven shaft, a valve mechanism for controlling the inlet and outlet of fluid to the end of said cylinder occupied by said first piston, and means including a valve device for connecting the two ends of said cylinder so that the fluid actuates said second piston.

5. A two-speed fluid motor comprising, in combination, a casing, a cylinder therein, a piston slidably mounted in said cylinder, a second piston of smaller size slidably mounted in said cylinder and selectively operable as a piston or as a rod for said first mentioned piston, a driven shaft, means forming a driving connection between said second piston and the driven shaft, valve mechanism for controlling the inlet and outlet of fluid to the end of said cylinder occupied by said first piston, and means for connecting the two ends of said cylinder so that the fluid actuates said second piston.

6. A two-speed fluid motor comprising, in combination, a casing, a driven shaft rotatably mounted therein, a series of parallel cylinders arranged annularly about said shaft, pistons reciprocable in the head ends of said cylinders, supplemental pistons of a smaller size reciprocable in said cylinders and extending from the opposite ends thereof, a valve driven by said shaft for controlling the inlet and outlet of fluid to and from the head ends of said cylinders, means for connecting the head ends of said cylinders with the opposite ends thereof for transferring fluid therebetween and an annular valve device operable in one position to close said connecting means and render the large pistons effective to drive said shaft and operable in another position to open said connecting means and render said smaller pistons effective to drive the shaft, and means for moving said valve device.

7. A two-speed fluid motor comprising, in combination, a casing, a driven shaft rotatably mounted therein, a series of parallel cylinders arranged annularly about said shaft, pistons reciprocable in the head ends of said cylinders, supplemental pistons of a smaller size reciprocable in said cylinders and extending from the opposite ends thereof, valve means for controlling the inlet and outlet of fluid to and from the head ends of said cylinders, means for connecting the head ends of said cylinders with the opposite ends thereof for transferring fluid therebetween, a shiftable valve device operable in one position to close said connecting means and render the large pistons effective to drive said shaft and operable in another position to open said connecting means and render said smaller pistons effective to drive said shaft, means for moving said valve device into said first mentioned position, and pressure fluid operated means for moving said valve device into said second mentioned position.

8. A two-speed fluid motor comprising, in combination, a casing, a driven shaft rotatably mounted therein, a series of parallel cylinders arranged annularly about said shaft, large pistons reciprocable in the head ends of said cylinders, supplemental pistons of a smaller size reciprocable in said cylinders and extending from the opposite ends thereof, a valve device driven by said shaft for controlling the inlet and outlet of fluid to and from the head ends of said cylinders, means for connecting the head ends of said cylinders with the opposite ends thereof for transferring fluid therebetween, an annular valve device surrounding said shaft operable in one position to close said connecting means and render the large pistons effective to drive said shaft and operable in another position to open said connecting means and render said smaller pistons effective to drive said shaft, a resilient device for moving said valve device into said first mentioned position, and pressure fluid operated means for moving said valve device into said second mentioned position.

9. In a device of the character described, in combination, a casing having a plurality of annularly arranged cylinders therein, a port plate having recesses forming the head ends of said cylinders and provided with a port for each cylinder, a ring valve slidably mounted for eccentric movement on said port plate and over the ends of said ports, inlet and exhaust ports in said casing communicating with a valve chamber enclosing said valve, said inlet ports opening into the valve chamber radially outwardly of the cylinder ports and the outlet ports opening into the valve chamber radially inwardly of said cylinder ports, a driven shaft rotatably mounted in the casing and having an eccentric stud on its inner end for operating said valve, a plurality of low speed pistons in the head ends of said cylinders, a series of high speed pistons of smaller diameter slidably mounted in said cylinders and selectively operable as pistons or as rods for said first mentioned pistons, a wobble plate device forming a driving connection between said high speed pistons and said shaft and including an anti-friction bearing having relatively movable races, one of which has a flat end surface engaging with a line contact the adjacent conical ends of said high speed pistons, and control means for changing the speed of said driven shaft by rendering one set of pistons or the other effective to operate said wobble plate comprising means for alternatively connecting said cylinder ports to the opposite ends of the cylinders including an annular valve device surrounding said shaft and within the cylinder annulus operable in one position to close said connecting means and render the low speed pistons effective to drive the shaft and operable in another position to open said connecting means and render the high speed pistons effective to drive the shaft, means for shifting said valve device and means for relieving the pressure in the rod ends of said cylinders when the motor is operating at low speed.

10. In a device of the character described, in combination, a casing having a plurality of cylinders therein, a port for the head end of each cylinder and a valve chamber, a valve slidably mounted in the valve chamber for eccentric movement over the ends of said ports, inlet ports opening into the valve chamber to one side of the cylinder ports and outlet ports opening into the valve chamber to the other side of said cylinder ports, a driven shaft rotatably mounted in the casing, an eccentric means thereon for operating said valve, a plurality of large pistons in one end of said cylinders, a series of pistons of smaller diameter slidably mounted in the other ends of said cylinders and selectively operable to drive the shaft, means forming a driving connection between said smaller sized pistons and said shaft, and control means for changing the speed of said driven shaft by rendering one set of pistons or the other effective to operate said shaft comprising means for alternatively connecting said cylinder ports to the opposite ends of the cylinders including a valve device operable in one position to open said connecting means and render the small pistons effective to drive the shaft, means for shifting said valve device to close said connecting means and render said large pistons effective, and means for relieving the pressure in the rod ends of said cylinders when the motor is operating at low speed.

11. In a device of the character described, a casing comprising a motor block having a plurality of annularly arranged parallel cylinders formed therein, and a cylinder port opening through one face of the block to each of the cylinders, a section having fluid supply and exhaust passages formed therein and an annular spacer interposed between said section and said motor block, one of said passages communicating with the space formed between said motor block and said section through an annular slot concentric and inwardly of said ports and the other of said passages communicating with said space adjacent the periphery of the space, and a disk-like valve having a fluid-tight sliding fit in the space between said motor block and said section, an annular passage formed in said valve opening through both faces of the valve, said passage always being in communication with the annular slot and the space beyond the periphery of the valve always being in communication with the other of said fluid passages, means for imparting to said valve an eccentric motion whereby the valve successively connects the ports alternately to the supply and exhaust passage, a plurality of low speed pistons in said cylinders, a series of pistons of smaller diameter slidably mounted in said cylinders and selectively operable as pistons or as rods for said first mentioned pistons, a wobble plate device forming a driving connection between said smaller sized pistons and said shaft, and control means for changing the speed of said driven shaft by rendering one set of pistons or the other effective to operate said wobble plate comprising means for alternatively connecting said cylinder ports to the opposite ends of the cylinders.

12. A fluid motor comprising, in combination, a casing, a first series of piston and cylinder devices in said casing, a second series of smaller piston and cylinder devices in said casing, a driven shaft, a wobble plate secured to said shaft and operable by the pistons of said devices to drive the shaft, a valve mechanism for controlling the inlet and outlet of fluid to one series of cylinders, and a valve device for selectively directing the fluid into the other series of cylinders.

13. In a device of the character described, in combination, a casing having a plurality of cylinders therein, a port for the head end of each cylinder and a valve chamber, a valve slidably mounted in the valve chamber for eccentric movement over the ends of said ports, inlet ports opening into the valve chamber to one side of the cylinder ports and outlet ports opening into the valve chamber to the other side of said cylinder ports, a driven shaft rotatably mounted in the casing, means driven thereby for giving an eccentric movement to said valve, a plurality of large pistons in said cylinders, a series of pistons of smaller diameter slidably mounted in said cylinders and selectively operable to drive the shaft, means forming a driving connection between said pistons and said shaft, and control means for changing the speed of said driven shaft by rendering one set of pistons or both sets of pistons effective to operate said shaft.

14. A multi-speed fluid motor comprising, in combination, a casing, a plurality of pistons, a driven shaft, adjustable means connecting the pistons to drive said shaft, means for conducting fluid to and from said pistons including a control device operable in one position to effect operation of certain of the pistons and operable in another position to effect operation of other of the pistons, and means for adjusting the means connecting the pistons to drive the shaft to vary the strokes of the pistons.

15. A two-speed fluid motor comprising, in combination, a casing, a shaft rotatably mounted in said casing, means for rotating said shaft comprising a plurality of piston and cylinder devices arranged annularly about said shaft and means connecting the pistons thereof to drive the shaft, and means for controlling the flow of fluid to and from said pistons including a tubular valve device slidably mounted in said casing and surrounding said shaft operable in one position to effect operation of said shaft at one speed and operable in another position to effect operation of said shaft at another speed.

16. A two-speed fluid motor comprising, in combination, a casing, a shaft extending longitudinally of said casing, a plurality of cylinders extending longitudinally of the casing and arranged about the shaft parallel therewith, pistons reciprocable in said cylinders including low speed and high speed pistons, a wobble plate for converting the reciprocatory movement of said pistons into rotary movement of said shaft, and means for conducting pressure fluid to and from said cylinders operable alternatively to effect operation of said shaft at a low speed or to effect operation of said high speed pistons only, said low speed pistons remaining stationary, to drive said shaft at a higher speed.

17. A two-speed fluid motor comprising, in combination, a casing, a shaft extending longitudinally of said casing, a first annular series of cylinders formed in said casing surrounding said shaft, a second annular series of smaller cylinders formed in said casing, fluid supply and exhaust ports in said casing, a port leading to each of the cylinders of one of said series, a valve controlling communication of said ports with said supply and exhaust ports, pistons reciprocable in said cylinders, a wobble plate mounted on said shaft and engaged by said pistons to convert the reciprocatory movement of said pistons into rotary movement of said shaft, and means including a valve for changing the speed of said driven shaft by rendering one or both sets of piston and cylinder devices effective to drive said shaft.

GUNNAR A. WAHLMARK.